(12) United States Patent
Kado

(10) Patent No.: US 10,819,864 B2
(45) Date of Patent: Oct. 27, 2020

(54) INFORMATION PROCESSING APPARATUS, CONTROL METHOD FOR INFORMATION PROCESSING APPARATUS, AND PROGRAM

(71) Applicant: CANON KABUSHIKI KAISHA, Tokyo (JP)

(72) Inventor: Kazuki Kado, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/520,098

(22) Filed: Jul. 23, 2019

(65) Prior Publication Data

US 2019/0349485 A1 Nov. 14, 2019

Related U.S. Application Data

(63) Continuation of application No. 16/032,590, filed on Jul. 11, 2018, now Pat. No. 10,412,237, which is a continuation of application No. 15/374,221, filed on Dec. 9, 2016, now Pat. No. 10,051,136.

(30) Foreign Application Priority Data

Dec. 11, 2015 (JP) ................................ 2015-242193

(51) Int. Cl.
*H04N 1/00* (2006.01)
(52) U.S. Cl.
CPC ..... *H04N 1/00212* (2013.01); *H04N 1/00307* (2013.01); *H04N 1/00315* (2013.01); *H04N 1/00408* (2013.01); *H04N 2201/0094* (2013.01)
(58) Field of Classification Search
CPC .... G06F 3/1222; G06F 3/1236; G06F 3/1238; G06F 3/1292; G06F 16/10; G06F 16/44; G06F 16/93; G06F 16/951; G06F 16/9535; G06F 16/9537; G06F 16/9554; G06F 19/321; G06F 1/1626; G06F 1/1656; G06F 1/1684; G06F 1/1686; G06F 1/169; G06F 1/181; G06F 21/31; G06F 3/03545; G06K 15/4095; H04N 1/00127; H04N 2201/006; H04N 1/00151; H04N 1/00204; H04N 1/00244; H04N 21/42203; H04N 21/4223; H04N 21/4227; H04N 21/4334; H04N 21/44016; H04N 21/4524; H04N 21/47214; H04N 21/812; H04N 2201/0084; H04N 5/225; H04N 5/265; H04N 5/775;

(Continued)

(56) References Cited

U.S. PATENT DOCUMENTS 10,051,136 B2 * 8/2018 Kado .................. H04N 1/00315
10,412,237 B2 * 9/2019 Kado .................. H04N 1/00307
2009/0119758 A1 5/2009 Tsuchiya
(Continued)

FOREIGN PATENT DOCUMENTS

JP 2013-201566 A 10/2013
KR 10-2008-0091147 A 10/2008

*Primary Examiner* — Negussie Worku
(74) *Attorney, Agent, or Firm* — Canon U.S.A., Inc. IP Division

(57) ABSTRACT

An information processing apparatus is provided and includes a display unit which displays an operation screen. The information processing apparatus controls whether or not to receive setting for a first application from a different apparatus and use the received setting for the first application, in accordance with a type of a screen being displayed on the display unit.

26 Claims, 10 Drawing Sheets

(58) Field of Classification Search
CPC .......... H04N 7/142; H04N 7/147; H04N 7/15; H04N 7/17318
USPC ...................................................... 358/1.15
See application file for complete search history.

(56) References Cited

U.S. PATENT DOCUMENTS

| | | |
|---|---|---|
| 2013/0250326 A1 | 9/2013 | Kono |
| 2016/0173728 A1* | 6/2016 | Kasuya .............. H04N 1/32496 358/1.14 |
| 2016/0301824 A1* | 10/2016 | Shibao ............... H04N 1/32112 |
| 2017/0171401 A1* | 6/2017 | Kado ................. H04N 1/00212 |
| 2017/0264758 A1* | 9/2017 | Naito ..................... H04L 51/22 |
| 2019/0037088 A1* | 1/2019 | Yamamoto ............ G06F 3/1258 |
| 2019/0132458 A1* | 5/2019 | Okuno .............. H04N 1/00503 |
| 2019/0286388 A1* | 9/2019 | Liu ........................ G06F 3/1292 |
| 2019/0306343 A1* | 10/2019 | Kado ................. H04N 1/00209 |
| 2019/0327365 A1* | 10/2019 | Shibao .............. H04N 1/00307 |
| 2019/0349485 A1* | 11/2019 | Kado ................. H04N 1/00212 |

* cited by examiner

INFORMATION PROCESSING APPARATUS, CONTROL METHOD FOR INFORMATION PROCESSING APPARATUS, AND PROGRAM

CROSS-REFERENCE TO RELATED APPLICATIONS

This application is a continuation of U.S. patent application Ser. No. 16/032,590, which was filed on Jul. 11, 2018 and which is a continuation of U.S. patent application Ser. No. 15/374,221, now U.S. Pat. No. 10,051,136, which was filed on Dec. 9, 2016 and which claims priority to Japanese Patent Application No. 2015-242193, which was filed on Dec. 11, 2015. These applications are hereby incorporated by reference herein.

BACKGROUND OF THE INVENTION

Field of the Invention

The present invention relates to a technique for starting an application in response to reception of setting information from an external apparatus.

Description of the Related Art

In recent years, multifunction peripherals (MFPs) including a scanner function, a print function, a copy function, and the like have been developed. In accordance with the development of MFPs, MFPs including a FAX transmission and reception function or a SEND function for attaching an original image obtained by reading an original document to an email (hereinafter, simply referred to as a mail) and transmitting the mail including the original image attached thereto have emerged. In the SEND transmission function, a destination of a mail may be set when a user specifies an address registered in an address book of an MFP or directly inputs an address using an operation panel of the MFP. Furthermore, in recent years, the need to use data in a mobile terminal for business has increased, and a function which allows cooperation between an MFP and a mobile terminal has emerged.

A function which allows, by cooperation between an MFP and a mobile terminal, for example, a destination held in the mobile terminal to be registered to the MFP as a destination to be used in a SEND transmission function of the MFP may be considered. A technique is disclosed in Japanese Patent Laid-Open No. 2009-65308 in which when a startup application receives an event, an associated application is started. With the technique disclosed in Japanese Patent Laid-Open No. 2009-65308, at registration of a destination held in a mobile terminal with an MFP, an application for executing a SEND transmission function may be started.

SUMMARY OF THE INVENTION

There may be an environment such as an MFP in which only one application for which a user performs certain setting may be started. In such a case, if a startup application starts a startup target application, setting for another running application may be rejected against the intension of a user.

In one embodiment, an information processing apparatus includes a display unit, a memory device that stores a set of instructions; and at least one processor that executes the instructions. Upon execution of the instructions, the at least one processor controls whether or not to receive setting for a first application from a different apparatus and use the received setting for the first application, in accordance with a type of a screen being displayed on the display unit.

Further features of the present invention will become apparent from the following description of exemplary embodiments with reference to the attached drawings.

DESCRIPTION OF THE EMBODIMENTS

Hereinafter, embodiments of the present invention will be described with reference to drawings.

First Embodiment

Figure 1:
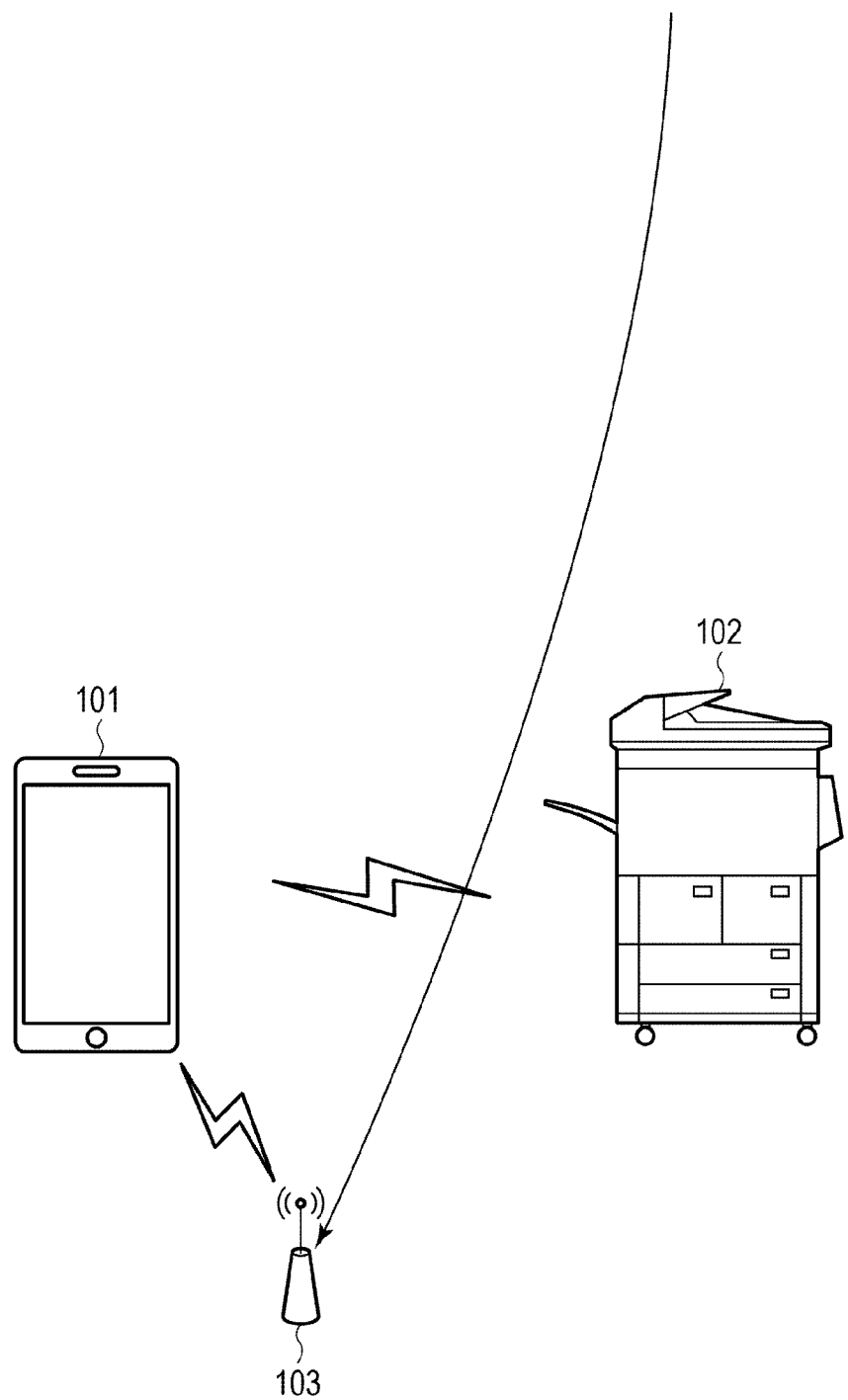
FIG. 1 is a diagram illustrating a system configuration including a mobile terminal apparatus and an MFP according to an embodiment.

FIG. 1 is a diagram illustrating an example of a system configuration applied in a first embodiment. A system according to the first embodiment includes a mobile terminal 101, an MFP 102, and an access point 103. The mobile terminal 101, the MFP 102, and the access point 103 may communicate with one another via corresponding communication media. The configuration illustrated in FIG. 1 is merely an example of general configuration. A mobile terminal used by a general user may be a different information apparatus. Furthermore, the MFP having the configuration illustrated in FIG. 1 does not necessarily include the above-mentioned configuration and may have any form as long as it includes a SEND transmission function. Moreover, an MFP is not necessarily provided. Any form is possible as long as the apparatus is an information processing apparatus including a function for performing mail transmission of data obtained using a function provided in the apparatus.

Figure 2:
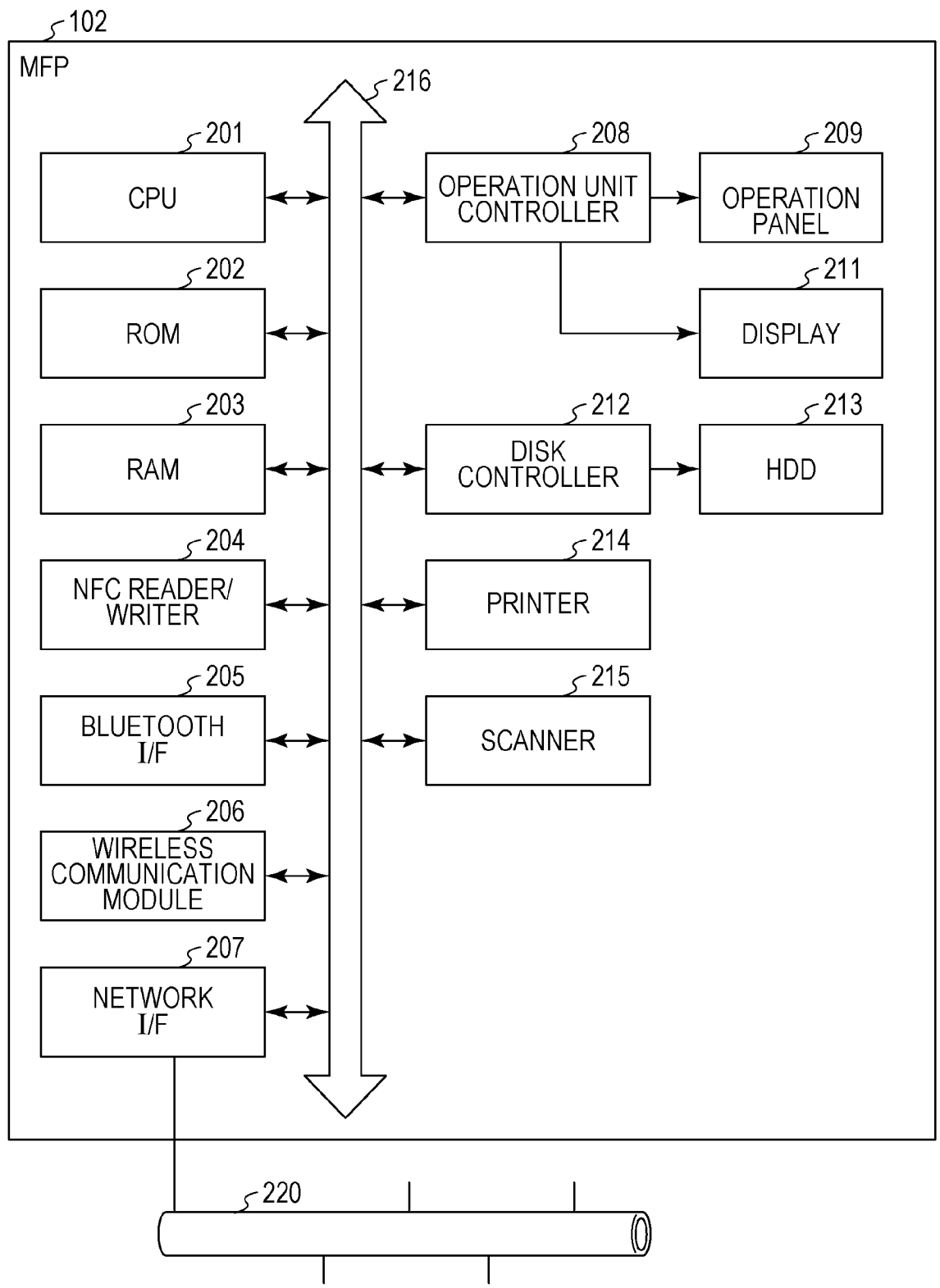
FIG. 2 is a block diagram illustrating a configuration of an MFP according to an embodiment.

FIG. 2 is a diagram illustrating an example of an inner configuration of the MFP 102 according to the first embodiment. The MFP 102 includes a central processing unit (CPU) 201 which executes software stored in a read only memory (ROM) 202 or, for example, in a hard disk drive (HDD) 213. The CPU 201 performs overall control of individual devices connected to a system bus 216. The HDD 213 may be used as a temporary storage location for images.

The RAM 203 functions as a main memory, a work area, and the like of the CPU 201. An operation unit controller 208 controls user interfaces such as various buttons, an operation panel 209, a display 211, and the like provided in the MFP 102. A disk controller 212 controls the HDD 213.

A network interface (I/F) 207 exchanges data with a different network apparatus, a file server, or the like via a network 220 in a bi-directional manner.

For operation in an infrastructure mode, a wireless communication module 206 is connected to the network 220 via the access point 103, and exchanges data with a different network apparatus such as the mobile terminal 101, a file server, or the like in a bi-directional manner. For operation in a software access point (AP) mode, the MFP 102 may be configured to operate as an access point and establish Wi-Fi direct connection with a mobile terminal.

A printer 214 is a print unit implemented in an electrophotographic method for printing on paper. Printing may be implemented in the electrophotographic method, an inkjet method, or other methods.

A scanner 215 is an image reading unit for reading an image printed on paper. In many cases, an auto document feeder (ADF), which is not illustrated in FIG. 2, is optionally mounted on the scanner 215. Therefore, a plurality of pages of original documents may be automatically read.

The MFP 102 may also transmit and receive data to and from various peripheral apparatuses including the mobile terminal 101 via an NFC reader/writer 204 or a Bluetooth® IF 205.

Figure 3:
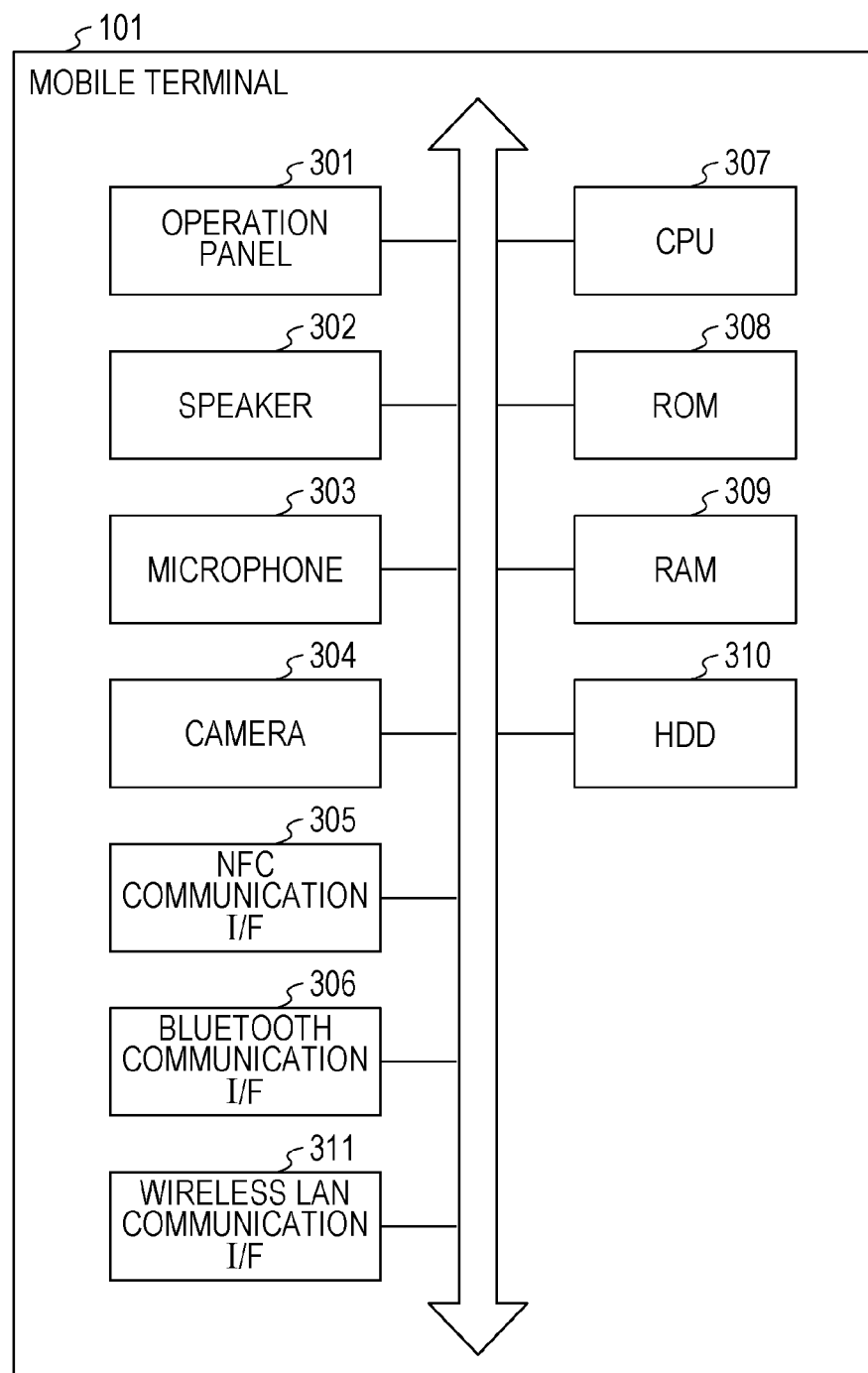
FIG. 3 is a block diagram illustrating a configuration of a mobile terminal according to an embodiment.

Next, a hardware configuration of the mobile terminal 101 will be explained with reference to FIG. 3. The mobile terminal 101 in the first embodiment is assumed as a terminal apparatus such as a smartphone or a tablet PC. However, the present invention is not limited to this. Any form is possible as long as the apparatus is an information processing apparatus including a function for communicating with other apparatuses.

A CPU 307 performs various processes for reading a control program stored in a ROM 308 and controlling an operation of the mobile terminal 101. The ROM 308 stores the control program. A RAM 309 is used as a main memory and a temporary storage area such as a work area of the CPU 307. An HDD 310 stores various data such as photographs and electronic documents.

An operation panel 301 includes a touch panel function which may detect a touch operation of a user. The operation panel 301 is a user interface which displays various screens provided by an operating system (OS) or a mail transmission application. By inputting a touch operation on the operation panel 301, a user is able to input a desired operating instruction to the mobile terminal 101. The mobile terminal 101 may include a hardware key. A user may input an operating instruction to the mobile terminal 101 using the hardware key.

A speaker 302 and a microphone 303 are used by a user to talk with a person on a different mobile terminal or a fixed telephone. A camera 304 captures an image in accordance with an image capturing instruction from a user. A photograph taken by the camera 304 is stored in a predetermined region of the HDD 310.

The mobile terminal 101 may transmit and receive data to and from various peripheral apparatuses including the MFP 102 via an NFC communication I/F 305, a Bluetooth I/F 306, or a wireless LAN communication I/F 311.

Next, cooperation between the mobile terminal 101 and the MFP 102 will be described. In the first embodiment, the mobile terminal 101 exchanges information by performing wireless communication with the MFP 102. That is, the mobile terminal 101 transmits transmission setting information indicating transmission setting for a destination and the like to the MFP 102 through wireless communication. Hereinafter, an operation of the mobile terminal 101 for identifying the MFP 102 as a communication partner on a wireless network and establishing connection will be referred to as pairing. To perform pairing, the mobile terminal 101 needs to acquire Wi-Fi connection information of a desired MFP 102. Regarding the Wi-Fi connection information, for example, in the case of Wi-Fi direct connection, information of an SSID of the MFP 102 operating as a soft access point and a KEY for connection to a network identified by the SSID is required. In the case of an infrastructure mode, the mobile terminal 101 and the MFP 102 are connected to a network within the same access point, and therefore, for example, an IP address of the MFP 102 is required. The mobile terminal 101 may acquire information necessary for performing pairing from the MFP 102 in various methods. For example, the mobile terminal 101 may acquire Wi-Fi connection information from a two-dimensional code displayed on the MFP 102 or acquire Wi-Fi connection information through NFC communication by touching the NFC reader/writer 204 of the MFP 102. Alternatively, the mobile terminal 101 may acquire Wi-Fi connection information by performing Bluetooth low energy (BLE) communication with the Bluetooth UF 205 of the MFP 102. Furthermore, the mobile terminal 101 may directly perform data transmission of a destination and the like to the MFP 102 with which Wi-Fi connection has already been established and pairing has been performed, without performing an operation of a two-dimensional code or the like.

The mobile terminal 101 may register transmission setting including a destination and the like of mail transmission with the MFP 102, with which pairing has been performed or pairing is to be performed. That is, transmission setting information is transmitted from the mobile terminal 101 to the MFP 102 through wireless communication, and upon reception of the transmission setting information, the MFP 102 performs processing for causing the transmission setting to be reflected in the destination and the like to be used for the SEND transmission function. Hereinafter, an application for executing a SEND transmission function will be simply referred to as a mail transmission application. The mail transmission application is, for example, an application in which the MFP 102 attaches to a mail an original image obtained by reading an original document with the scanner 215 of the MFP 102 and transmits the mail including the original image attached thereto.

Figure 4:
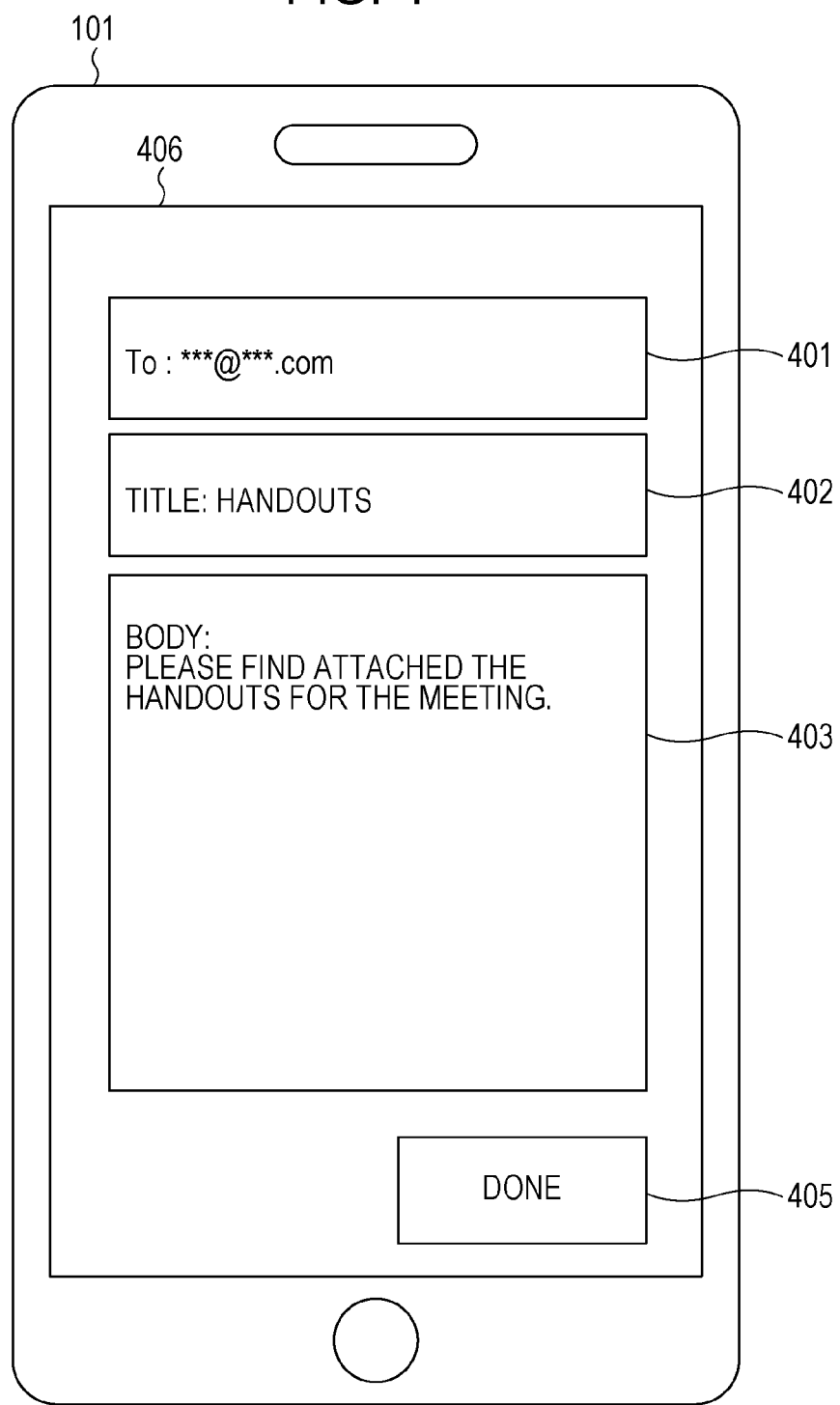
FIG. 4 is a diagram illustrating a mobile application setting screen of a mobile terminal according to an embodiment.

Next, setting items set by the mobile terminal 101 for mail transmission to be used for transmission setting for a transmission application of the MFP 102 will be explained with reference to FIG. 4. FIG. 4 is a diagram illustrating an example of a screen in which a user inputs setting items for mail transmission in an application on a mobile terminal side which corresponds to a transmission application of the MFP 102.

A user inputs information necessary for mail transmission on a setting screen 406 for mail transmission of the mobile terminal 101. In a mail address field 401, an address in an address book stored in the mobile terminal 101 may be selected and input. A user may input a desired character string, using a soft keyboard of the mobile terminal 101, to the mail address field 401, a title field 402, and a body field 403. To the above fields, input by speech recognition or the like as well as input using a soft keyboard is possible. When a done button 405 is pressed, mail transmission setting is completed. That is, setting information indicating transmission setting for mail transmission is transmitted from the mobile terminal 101 to the MFP 102. Transmission from the mobile terminal 101 to the MFP 102 may be performed immediately after the operation panel 301 detects pressing of the done button 405. Alternatively, as described above, transmission setting may be transmitted after processing necessary for pairing with the MFP 102 is performed. In the first embodiment, setting information may be transmitted at any time. Pressing may include touching a touch panel screen as well as physically pressing a button. Hereinafter, the same applies to the below.

Next, a screen of the MFP 102 will be described with reference to FIG. 5. The MFP 102 according to the first embodiment may start one of a plurality of applications.

Starting an application includes starting an application and displaying an operation screen of the application on the operation panel 301. Furthermore, starting an application includes recovering the application in a suspend state and displaying an operation screen of the application on the operation panel 301.

That is, on the operation panel 301 of the MFP 102, an operation screen of a single application is displayed. FIG. 5 illustrates a transmission screen 501 which is displayed on the operation panel 301 when the above-described mail transmission application is started. The transmission screen 501 is a screen for performing setting for a destination and setting for scanning.

A destination list 502 is a list of destinations set as transmission destinations. A destination is an address of an email, IP FAX, server, or the like. The destination list 502 illustrated in FIG. 5 indicates a state in which a transmission destination is not set. A scan setting button 503 is used for changing scan setting. When a detailed information button 505 is pressed, transition to a screen on which detailed information of a selected destination is displayed is made. When a delete destination button 506 is pressed, the MFP 102 deletes a selected destination. When an other settings button 507 is pressed, the MFP 102 displays a screen (not illustrated in figures) of a menu list for change of contents for transmission. For example, edition of a mail body and the like may be performed on a screen which is caused to appear by pressing of the other settings button 507. When a specify destination button 509 is pressed, a destination may be set using an address book or the like of the MFP 102. The MFP 102 may often be used among multiple users, and an address book includes addresses to be used by other users. Therefore, setting a destination using an address book of the MFP 102 may require time and labor. Furthermore, the display 211 of the MFP 102 is usually small, and the operability of the operation panel 209 may be poor compared to PCs or the like. Therefore, directly inputting a mail address to the MFP 102 may require time and labor. Thus, in the first embodiment, with cooperation between the MFP 102 and the mobile terminal 101, transmission setting from the mobile terminal 101 is applied to the MFP 102. When a specify destination from mobile device button 508 is pressed, transition to a screen for receiving mail transmission setting information is made, and the MFP 102 enters a standby state for performing pairing with a mobile terminal (not illustrated in figures).

Figure 5:
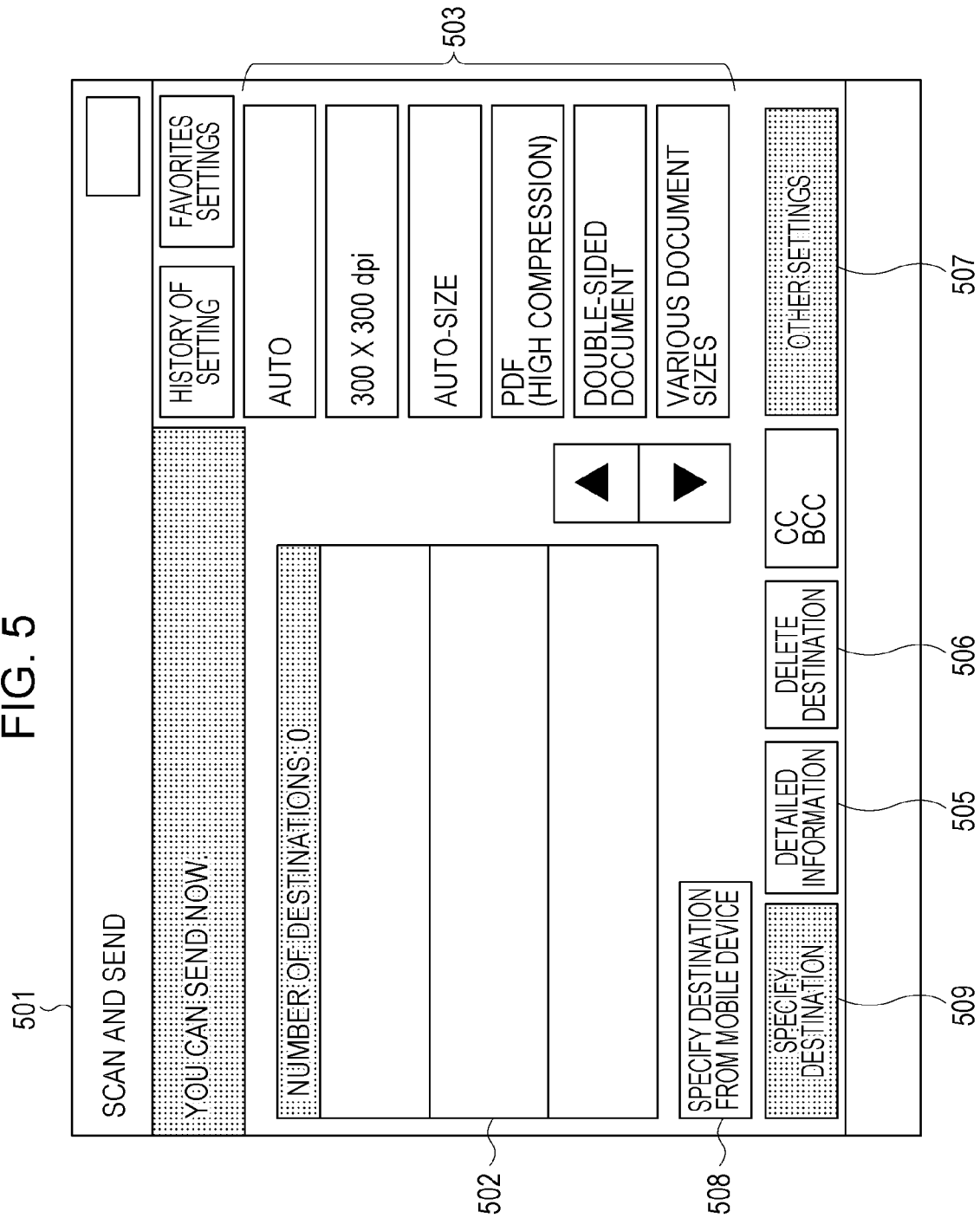
FIG. 5 is a diagram illustrating a screen of a mail transmission application of an MFP according to an embodiment.

The MFP 102 may receive transmission setting from the mobile terminal 101 when the specify destination from mobile device button 508 illustrated in FIG. 5 is pressed and the MFP 102 enters the standby state or when the MFP 102 is not in the standby state. For example, in the state in which pairing between the MFP 102 and the mobile terminal 101 is completed, transmission setting is transmitted at a desired time (for example, at a time when the done button 405 illustrated in FIG. 4 is pressed) from the mobile terminal 101, and the MFP 102 thus receives the transmission setting. In contrast, in the case where the MFP 102 is not in the standby state, for example, the MFP 102 may have started an application different from the mail transmission application. In such a case, if processing for starting the mail transmission application and registering transmission setting transmitted from the mobile terminal 101 is performed, setting for the different application, which is currently running on the MFP 102, is rejected. Thus, in the first embodiment, in the case where the MFP 102 receives transmission setting from the mobile terminal 101, a running application is identified, and switching of processing is performed according to the running application. A specific process will be described with reference to FIG. 6.

Figure 6:
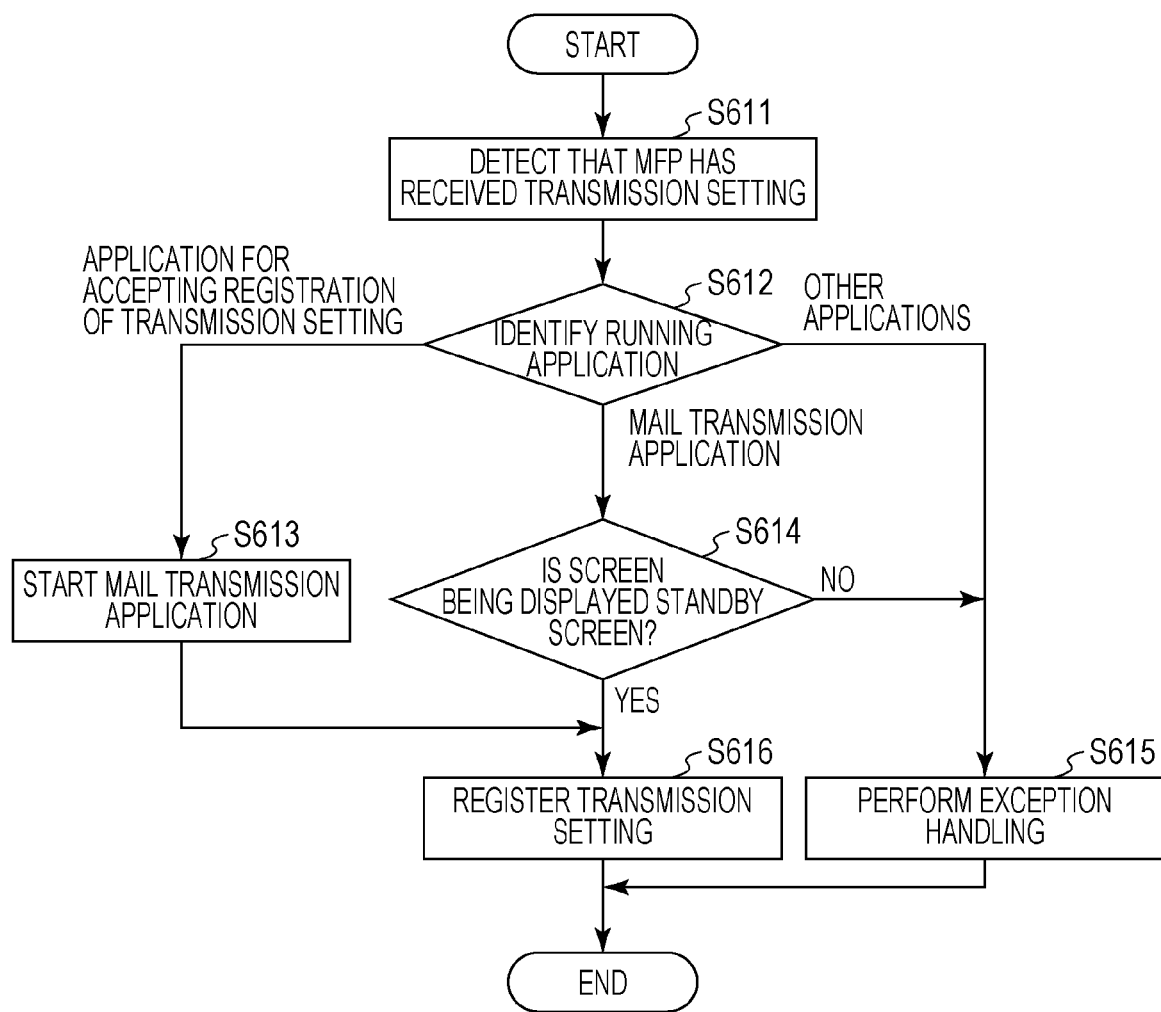
FIG. 6 is a flowchart illustrating an example of a process of an MFP according to an embodiment.
Figure 7:
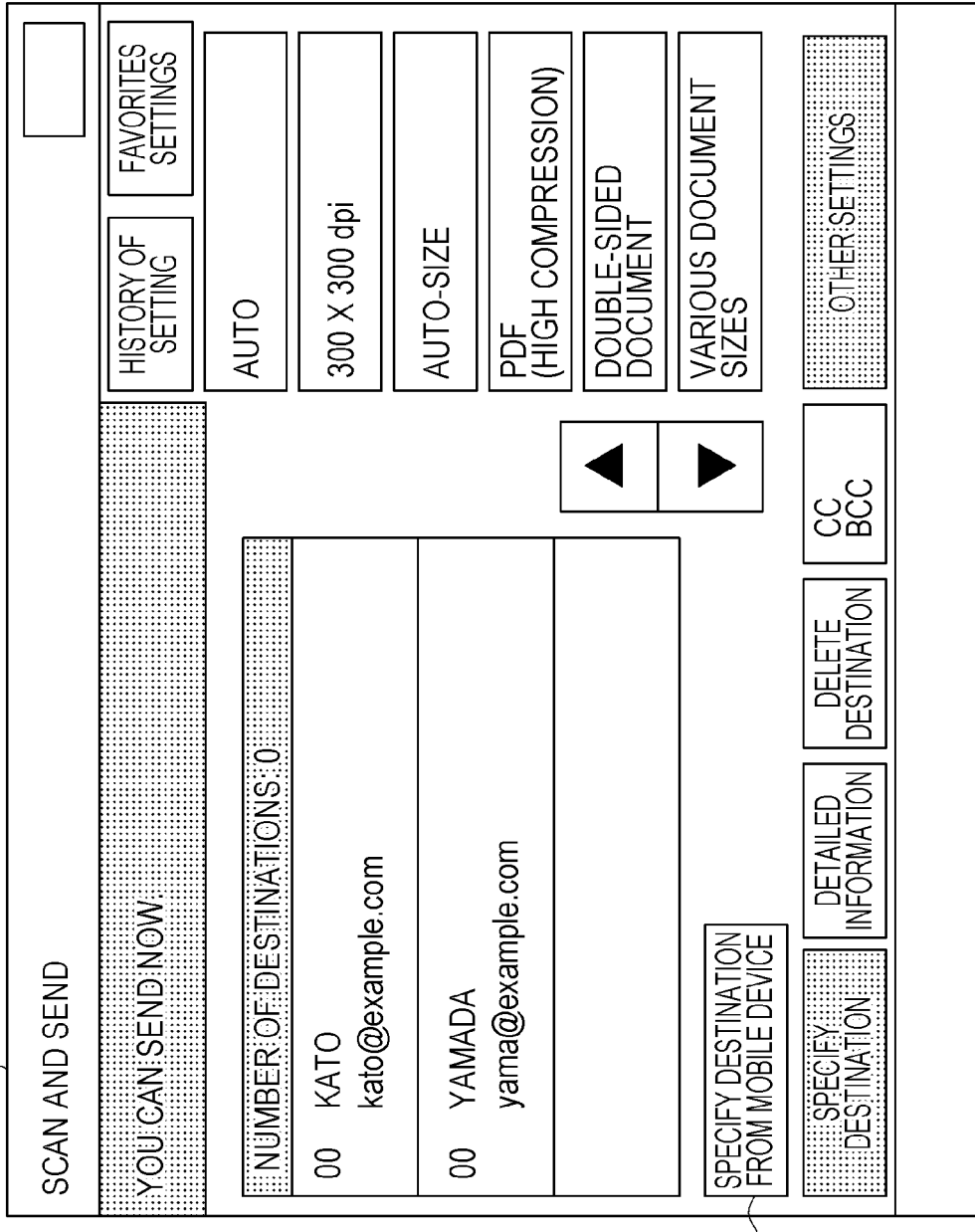
FIG. 7 is a diagram illustrating a screen of a mail transmission application of an MFP according to an embodiment.

FIG. 6 is a flowchart illustrating a process, which is a control program executed by the CPU 201 when the MFP 102 receives setting information indicating transmission setting from the mobile terminal 101. In the MFP 102 according to the first embodiment, a single CPU 201 performs each processing operation of the flowchart described below using a single memory (RAM 203). However, each processing operation of the flowchart may be performed in a different manner. For example, each processing operations of the flowchart may be performed by cooperation of a plurality of units, the CPU, the RAM, the ROM, and the storage.

In step S611, the CPU 201 of the MFP 102 detects, through the wireless communication module 206, that transmission setting information indicating transmission setting for a mail has been received from the mobile terminal 101. Transmission setting includes items such as a destination of a mail, a title, a body, a file name of a file attached, and the like. Next, in step S612, the CPU 201 identifies the type of an application which is currently running on the MFP 102. In the first embodiment, a running application may be categorized into three types: the above-described mail transmission application; an application for accepting registration of transmission setting; and other applications. A determination as to whether or not a running application is an application for accepting registration of transmission setting may be performed in, for example, a method for setting in advance which application accepts registration of transmission setting in the MFP 102 and identifying the application by referring to the setting. A specific application name, version, or the like may be identified or a determination as to whether or not a running application is an application for accepting registration of transmission setting may be made according to the attributes of the application (for example, a type of setting performed by the application).

That is, categorization in step S612 may be categorization of whether a running application is an application which directly handles the information received in step S611, an application for accepting processing of an application handing the received information, or an application for refusing processing of the received information.

In the case where it is determined, based on the determination in step S612, that the running application is an application for accepting registration of transmission setting, the process proceeds to step S613. In step S613, the CPU 201 closes the currently running application, and starts a mail transmission application, which is a different application. Then, the process proceeds to step S616, and the CPU 201 performs registration of the transmission setting received in step S611 in the mail transmission application. Closing the currently running application includes terminating the currently running application and causing the currently running application to enter the suspend state.

That is, in a first state, a screen of the currently running application is being displayed as a screen of the display 211 of the MFP 102. When the MFP 102 detects that transmission setting has been received from the mobile terminal 101, the screen of the display 211 is switched to a screen of a mail transmission application, which is different from the currently running application. Then, the switched screen is shifted to a second state, which is a screen in which the transmission setting from the mobile terminal 101 is reflected. At this time, on the display 211, after a screen of the mail transmission application is displayed once, the screen may be shifted to a screen in which the transmission setting is reflected. Alternatively, a screen of the mail transmission application in a state in which the transmission setting has already been reflected may be displayed. As described above, in the case where the currently running application is an application for accepting registration of transmission setting, processing for starting the mail transmission application in response to reception of the transmission setting and reflecting the transmission setting is performed.

Next, in the case where it is determined, based on the determination in step S612, that the running application is a mail transmission application, the process proceeds to step S614. In step S614, the CPU 201 inquires of the transmission application whether or not the screen being displayed on the operation panel 209 is a standby screen. The standby screen is a screen which waits for reception of transmission setting and which is displayed after the specify destination from mobile device button 508 illustrated in FIG. 5 is touched. The standby screen is not limited to this example. For example, the state in which the screen illustrated in FIG. 5 is being displayed may be defined as a standby screen.

In the case where the screen currently being displayed is a standby screen, the process proceeds to step S616, and the CPU 201 registers the transmission setting received in step S611 with the mail transmission application. That is, processing for reflecting the received transmission setting is performed. In contrast, in the case where it is determined in step S614 that the screen currently being displayed is not a standby screen, for example, in the case where the screen currently being displayed is a screen for performing scan setting or the lie, the process proceeds to step S615.

In two cases described below, the process proceeds to step S615. A first case is a case where it is determined, based on the determination in step S612, that the running application is neither an application for accepting registration of transmission setting nor a mail transmission application. A second case is a case where it is determined in step S614 that the screen being displayed is not a standby screen. In the first case, if the mail transmission application is started for the purpose of processing for reflecting transmission setting, abnormal termination such as rejection of setting for the currently running application, may occur. Furthermore, in the second case, in the case where the screen being displayed is not a standby screen, a user may have performed other settings in the mail transmission application. In such a case, similarly, processing for reflecting transmission setting causes setting which is currently being performed to be rejected. Thus, in step S615, the CPU 201 performs exception handling such as transmission of a notification of error to the mobile terminal 101. In the mobile terminal 101 to which the notification of error has been transmitted, an error is displayed on the operation panel 301 of the mobile terminal 101 or a warning sound or the like is output. Regarding determination conditions for steps S612 and S614, a table to be used for determination may be created and managed in the MFP 102.

Next, a screen of the MFP 102 displayed after transmission setting is received from the mobile terminal 101 will be described with reference to FIGS. 7 to 10. Upon registering the mail transmission setting in step S616 of FIG. 6, the MFP 102 indicates in the destination list illustrated in FIG. 5 a registered destination, as illustrated in a registered destination screen 701 of FIG. 7.

Figure 8:
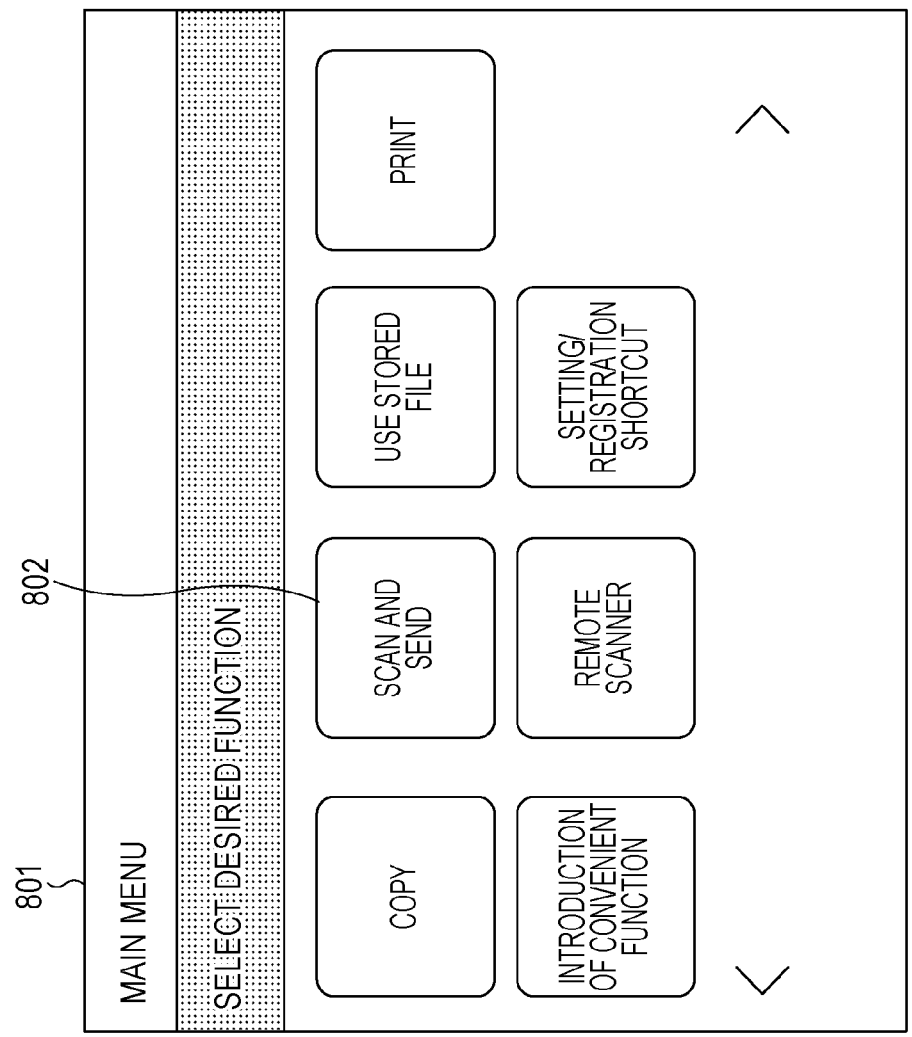
FIG. 8 is a diagram illustrating a screen of an application of a main menu of an MFP according to an embodiment.

In the case where the running application is a mail transmission application or the running application is an application for accepting registration of transmission setting as described above, mail transmission setting is performed in step S616 after the transmission setting is received. FIG. 8 illustrates an example of a screen of an application for accepting registration of transmission setting. FIG. 8 illustrates an example of a screen of an application of a main menu of the MFP 102. When each button such as copy, print, or the like is pressed, an application corresponding to the pressed button is started. In the case where a scan and send button 802 is pressed, the mail transmission application is started. In this example, it is assumed that an application of a main menu is an application for accepting registration of transmission setting. In such a case, upon receiving the transmission setting in step S611, the CPU 201 closes the currently running application of the main menu, and displays the registered destination screen 701 illustrated in FIG. 7.

Figure 9:
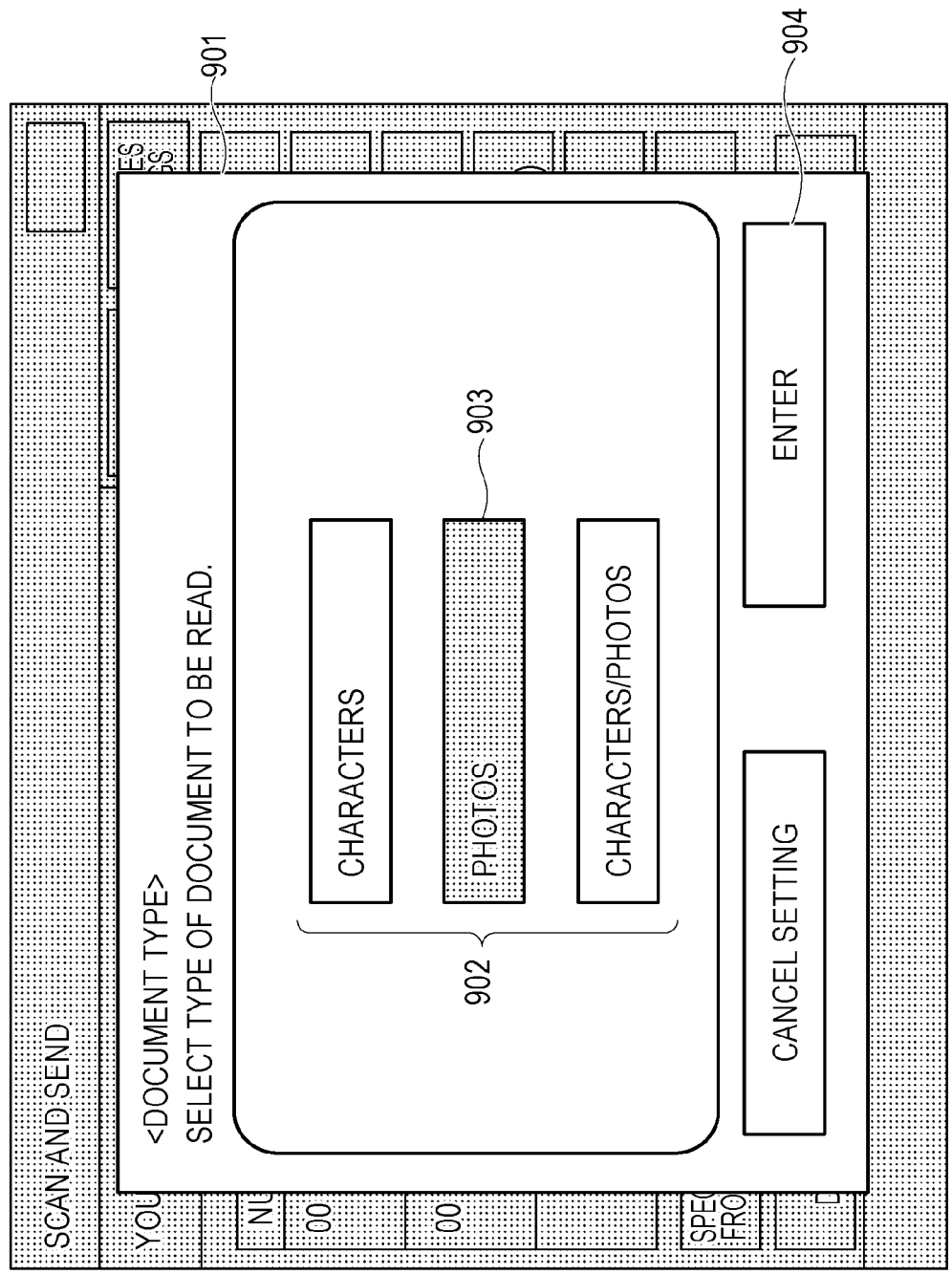
FIG. 9 is a diagram illustrating a screen for performing transmission setting of an MFP according to an embodiment.

FIG. 9 illustrates an example of a setting screen 901 for setting the type of an original document, the setting screen 901 being a screen of the mail transmission application. When a user selects a desired button 903 from a selection group 902 and presses an enter button 904, setting is completed. However, the setting screen 901 is not a standby screen. Therefore, if transmission setting is received in this state, exception handling is performed based on the determination in step S614.

Figure 10:
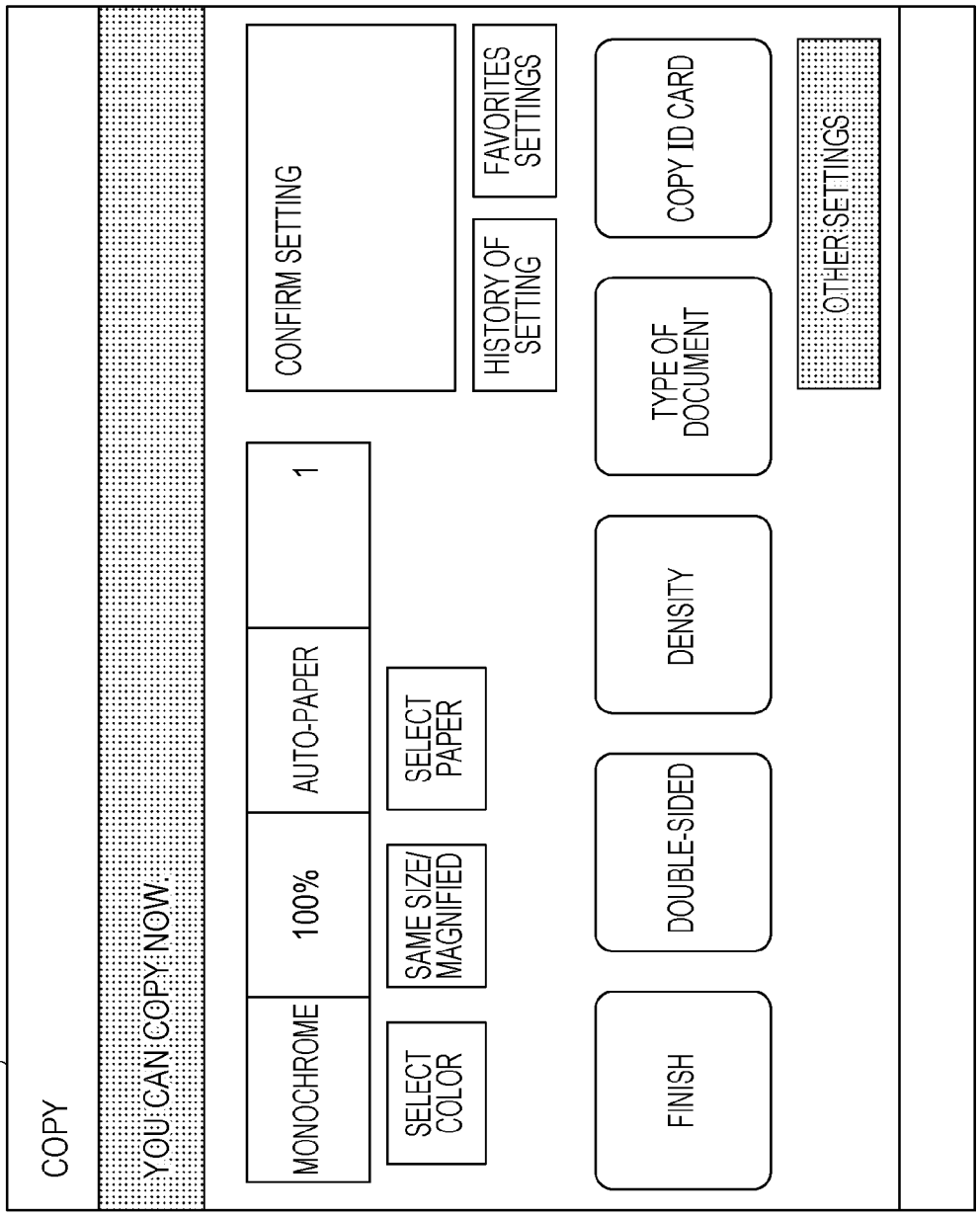
FIG. 10 is a diagram illustrating an example of a screen of a copy application of an MFP according to an embodiment.

FIG. 10 is a diagram illustrating an example of a copy application, which is identified as another application in step S612. FIG. 10 is a diagram illustrating a standby screen 1001 of the copy application. Also in this case, exception handling is performed based on the determination in step S612. Therefore, a screen being displayed on the MFP 102 is not changed.

As described above, according to the first embodiment, in a scene at which a certain application is started at an MFP when cooperation between a mobile terminal and the MFP is performed, setting for a currently running application may be prevented from being lost.

Other Embodiments

The mail transmission application for attaching a scanned image obtained by scanning an original document to a mail and transmitting the mail including the scanned image attached thereto has been described above by way of example. However, the present invention is not limited to this. Any application may be applicable as long as it is an application for transmitting certain data to an external apparatus and a transmission destination may be set through an external terminal apparatus. Furthermore, data to be transmitted may be in a form of an attached file or may be included in a mail body. Furthermore, data to be transmitted is not limited to a scanned image. Data stored in the MFP 102 may be transmitted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in cooperation between a mobile terminal and an MFP, setting for a currently running application may be prevented from being lost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image processing apparatus comprising:
a display device;
a scanner device that scans a document and generates image data;
a communicator that receives a destination from a communication terminal;
a transmitter that transmits, to the received destination, the image data generated by the scanner device; and
a controller that determines, when the communicator receives the destination in a state that the display device displays a screen which is different from a transmission screen of a transmission function of the image processing apparatus, whether the display device displays or not displays another screen in which the received destination is displayed, wherein the determination is based on the screen displayed by the display device;
wherein the display device displays the another screen in a case where the controller determines that the display device displays the another screen, and
wherein the display device does not display the another screen in a case where the controller determines that the display device does not display the another screen.

2. The image processing apparatus according to claim 1, wherein the controller determines that the display device displays, when based on receiving the destination by the communicator in a state that the display device displays a first screen which is different from the transmission screen, the another screen in which the received destination is displayed, and
wherein the controller does not determine that the display device displays, based on receiving the destination by the communicator in a state that the display device displays a second screen which is different from the transmission screen and is different from the first screen, the another screen in which the received destination is displayed.

3. The image processing apparatus according to claim 2, wherein the first screen is a selection screen for receiving a selection of a function from among a plurality of functions of the image processing apparatus by a user, and the second screen is a screen of a copy function.

4. The image processing apparatus according to claim 2, wherein, based on receiving the destination in the state in which the display device displays the second screen, the communicator transmits, to the communication terminal, information for displaying a message which indicates an error.

5. The image processing apparatus according to claim 2, wherein the first screen is a menu screen, and the second screen is a screen of a copy function.

6. The image processing apparatus according to claim 1, wherein the received destination is set as a transmission destination used by the transmitter.

7. The image processing apparatus according to claim 6, wherein the received destination is an e-mail address.

8. The image processing apparatus according to claim 1, wherein, based on receiving the destination by communicator in a state that the display device displays the first screen, the controller changes a state of an application that provides a predetermined function to a suspend state, and executes an application that provides the transmission function.

9. The image processing apparatus according to claim 1, wherein the communicator receives the destination from the communication terminal by using a wireless communication.

10. The image processing apparatus according to claim 9, wherein the display device displays a two-dimensional code for acquiring, by the communication terminal, connection information for establishing a connection with the image processing apparatus and the communication terminal for communication based on wireless communication.

11. The image processing apparatus according to claim 9, wherein the image processing apparatus transmits, to the communication terminal by using another wireless communication which is different from the wireless communication, connection information for establishing a connection with the image processing apparatus and the communication terminal for communication based on the wireless communication.

12. The image processing apparatus according to claim 11, wherein the another wireless communication is NFC (Near Field Communication) or Bluetooth® Low Energy.

13. A method comprising:
receiving image data from a scanner device;
receiving a destination from a communication terminal;
transmitting, to the destination, the image data received from the scanner device; and
determining, when the destination is received in a state that a screen which is different from a transmission screen of a transmission function of the image processing apparatus is displayed, whether a display device displays or does not display another screen in which the destination is displayed, wherein the determining is based on the screen.

14. A non-transitory computer-readable medium storing computer-executable instructions that, when executed by one or more computing devices, cause the one or more computing devices to perform operations comprising:
receiving image data from a scanner device;
receiving a destination from a communication terminal;
transmitting, to the destination, the image data received from the scanner device; and
determining, when the destination is received in a state that a screen which is different from a transmission screen of a transmission function of the image processing apparatus is displayed, whether a display device displays or does not display another screen in which the destination is displayed, wherein the determining is based on the screen.

15. An image processing apparatus comprising:
a display device;
a scanner device that scans a document to generate image data;
a communicator that receives a destination from a communication terminal;
a transmitter that transmits, to the received destination, the image data generated by the scanner device; and
a controller that determines, when the communicator receives the destination in a state that the display device displays a screen which is different from a transmission screen of a transmission function of the image processing apparatus, whether to cause the display device to display another screen in which the received destination is displayed, wherein the determination is based on information of the screen displayed by the display device,
wherein the controller causes the display device to display the another screen in a case where the controller determines to cause the display device to display the another screen, and
wherein the controller does not cause the display device to display the another screen in a case where the controller does not determine to cause the display device to display the another screen.

16. The image processing apparatus according to claim 15,
wherein the controller determines to cause the display device to display, based on receiving the destination by the communicator in a state that the display device displays a first screen which is different from the transmission screen, the another screen in which the received destination is displayed, and
wherein the controller does not determine to cause the display device to display, based on receiving the destination by the communicator in a state that the display device displays a second screen which is different from the transmission and is different from the first screen, the another screen in which the received destination is displayed.

17. The image processing apparatus according to claim 16, wherein the first screen is a selection screen for receiving a selection of a function from among a plurality of functions of the image processing apparatus by a user, and the second screen is a screen of a copy function.

18. The image processing apparatus according to claim 16,
wherein the communicator transmits, to the communication terminal, based on receiving the destination in the state in which the display device displays the second screen, information for displaying a message which indicates an error.

19. The image processing apparatus according to claim 16, wherein the first screen is a menu screen, and the second screen is a screen of a copy function.

20. The image processing apparatus according to claim 15,
wherein the received destination is set as a transmission destination used by the transmitter.

21. The image processing apparatus according to claim 20,
wherein the received destination is an e-mail address.

22. The image processing apparatus according to claim 15, wherein the communicator receives the destination from the communication terminal by using a wireless communication.

23. The image processing apparatus according to claim 22,
wherein the image processing apparatus transmits, to the communication terminal by using another wireless communication which is different from the wireless communication, connection information for establishing a connection with the image processing apparatus and the communication terminal for communication based on the wireless communication.

24. The image processing apparatus according to claim 23,
wherein the another wireless communication is NFC (Near Field Communication) or Bluetooth® Low Energy.

25. The image processing apparatus according to claim 22, wherein the display device displays a two-dimensional code for acquiring, by the communication terminal, connection information for establishing a connection with the image processing apparatus and the communication terminal for communication based on wireless communication.

26. The image processing apparatus according to claim 15,
wherein, based on receiving the destination by the communicator in a state that the display device displays the first screen, the controller changes a state of an application that provides a predetermined function to a suspend state, and executes an application that provides the transmission function.

* * * * *